Oct. 14, 1958   L. ANSELMINI ET AL   2,855,643
APPARATUS FOR MOLDING EXTENSIONS TO TUBING
Filed Feb. 11, 1955   2 Sheets-Sheet 1

INVENTORS
LUDWIG ANSELMINI
MALACHI P. KENNEY
BY
ATTORNEY

Oct. 14, 1958 L. ANSELMINI ET AL 2,855,643
APPARATUS FOR MOLDING EXTENSIONS TO TUBING
Filed Feb. 11, 1955 2 Sheets-Sheet 2

Inventors
LUDWIG ANSELMINI
MALACHI P. KENNEY
By
Attorney

United States Patent Office 2,855,643
Patented Oct. 14, 1958

2,855,643

APPARATUS FOR MOLDING EXTENSIONS TO TUBING

Ludwig Anselmini, Hicksville, and Malachi P. Kenney, Perkinsville, N. Y., assignors to Foster Wheeler Corporation, New York, N. Y., a corporation of New York Application February 11, 1955, Serial No. 487,654

9 Claims. (Cl. 22—116)

The present invention relates to tubular members for heat exchange apparatus and more particularly to a method of and apparatus for providing a tube with extended surface elements, for example, fin-like extensions.

In a heat exchange apparatus, for example, in economizers, a liquid is passed on the inside of tubes and a gas is passed around the outside of the tubes in indirect heat exchange relationship with the liquid in the tubes. To increase the heat transfer efficiency of the tubes, extended surface elements or fins are formed on the outside of the tubes to provide an additional amount of surface area for the gas to contact.

Presently known methods of and apparatus for molding extended surface elements or fins on a tube have not been satisfactory in that the cast metal does not readily adhere to the outer tube surface to form a metallurgical bond between fin and the tube surface. A metallurgical bond is not accomplished by present molding methods and apparatus because the tube surface does not reach the proper bonding temperature before the molten metal cools and solidifies. As a consequence, there is a thin air film or space between a substantial portion of the outer surface area of the tube and the inner periphery of the cast fins. These air spaces reduce the heat conductivity between the tube and the fins and thereby limits the heat transfer efficiency of the fin tube.

In accordance with the present invention, a method of and apparatus for forming an extended surface element on a tube is provided wherein a metallurgical bond is accomplished between substantially the entire outer peripheral surface area of the tube and the abutting surface area of the extended surface element. The tube on which the extension is to be formed is first cleaned and coated with a flux material. After the tube has been treated as aforesaid, it is inserted as a core in a casting space or cavity of a permanent type mold, which cavity is shaped in the form of the extension desired. Molten metal is introduced into the mold space so as to impinge against substantially the top surface of the tube and flow downwardly around said peripheral surface of the tube in a volume sufficient to heat the tube to a proper bonding temperature. The molten metal thereafter flows out of the casting cavity into an excess metal space which is of a size to receive all of the molten metal neecssary to raise the tube surface to the bonding temperature. Additional molten metal is then continuously poured into the mold cavity until the cavity is filled. The additional molten metal maintains the tube surface at the bonding temperature as it flows downwardly over the tube. Thereafter, the molten metal is allowed to cool and set thereby forming a tube with an extended surface element which metallurgically bonds to substantially the entire outer surface of the tube.

After the molten metal cools and solidifies, the tube is removed from the casting space and the mold cleaned. The tube is then indexed axially and re-positioned in the mold cavity so that another section of tube extensions may be cast to the tube in the manner previously described. By this method, a tube of any suitable length may have successive extensions cast thereon.

The invention together with its various features and advantages will be understood when taken in connection with the following description and accompanying drawings in which.

Figure 1:
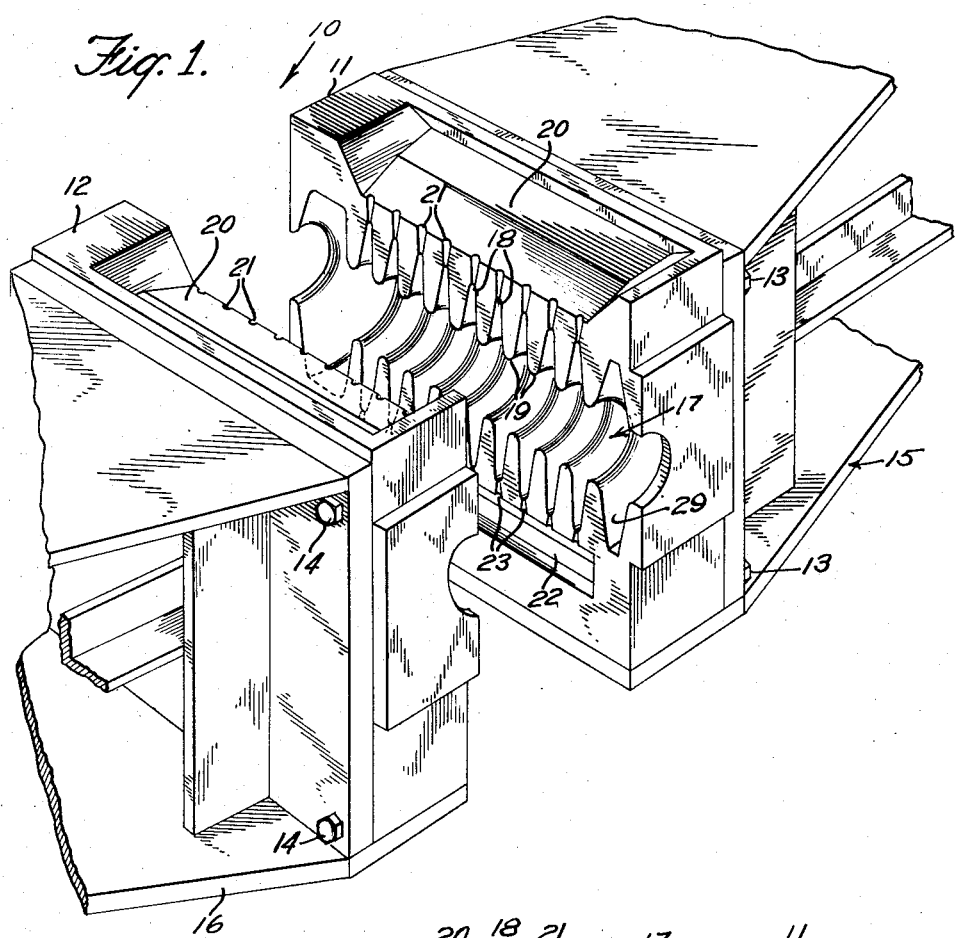
Fig. 1 is a view in perspective of the permanent type mold according to this invention employed in casting metal extensions to tubing.
Figure 4:
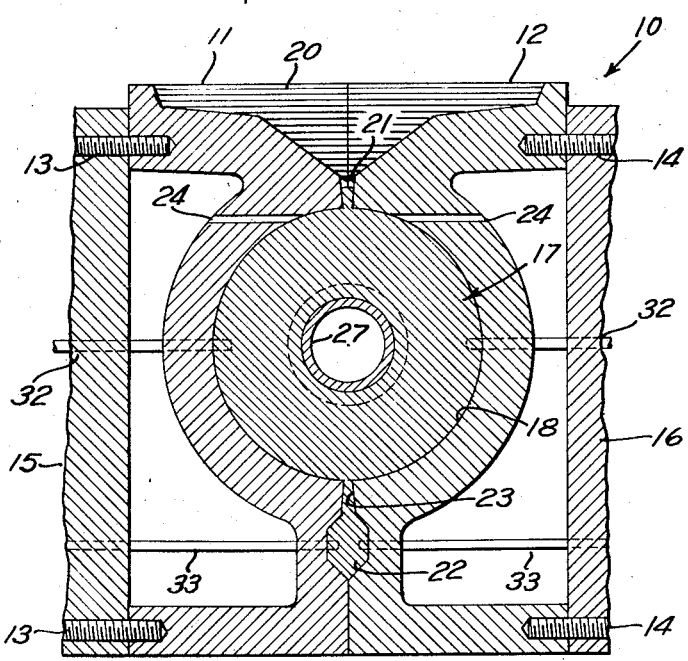
Fig. 4 is a section taken along line 4—4 of Fig. 3, somewhat enlarged.

Referring to the drawings, the reference numeral 10 designates a split mold, preferably of permanent metal, having two symmetrical sections or portions 11 and 12 (Figs. 1 and 4). Sections 11 and 12 are secured by a plurality of bolts 13 and 14, respectively, to suitable mold support members 15 and 16, best shown in Fig. 1. One of the support members is adapted in a suitable manner (not shown) for movement relative to the other member to carry the sections 11 and 12 in and out of abutment. Each of the sections are formed to provide, when moved into abutment, a cavity 17 for receiving molten metal therein. Cavity 17 is in the form of a continuous series of axially spaced disc-shaped recesses 18, adjacent disc-shaped recesses being joined by hub-shaped recesses 19. A filling trough or basin 20 for molten metal is provided in the upper portion of the mold and communicates with a plurality of substantially vertical passages 21, each of the passages 21 communicating with a disc shaped recess 18. Passages 21 are positioned in alignment with the longitudinal axis of the cavity 17 and extend substantially in the plane of the vertical axis of cavity 17 between the lower portion of the trough 20 and the extreme upper edge of the disc-shaped recesses 18. An excess metal trough 22 is disposed in the lower portion of the mold 10 and communicates through passages 23 with the disc-shaped recesses 18, a passage 23 communicating with each disc-shaped recess. Each passage 23 is in vertical alignment with a passage 21 and extends between the extreme lower edge of the disc-shaped recesses 18 and the upper portion of the trough 22.

Figure 2:
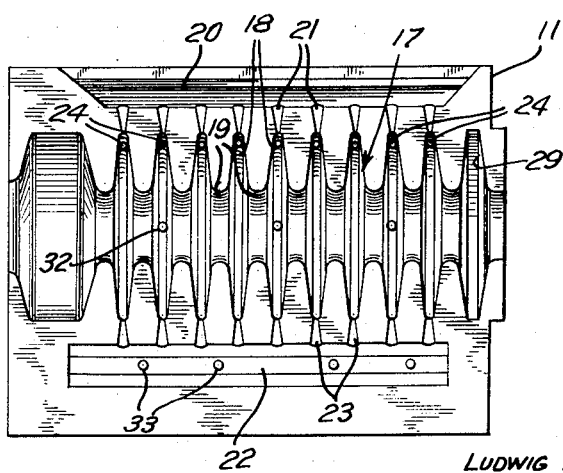
Fig. 2 is a view in elevation of one of the mold sections according to the present invention.

A plurality of vents 24, longitudinally spaced along the uppermost part of cavity 17, as shown in Figs. 2 and 4, are provided in each of the mold sections 10 and 11. The vents 24 connect cavity 17 with the atmosphere to permit the escape of gases which may develop within cavity 17. One end of the mold 10 is provided with an axial sleeve 25 and at the opposite end with a plug member 26.

Sleeve 25 is slidably receivable upon a tube 27 to which extensions are to be cast, and is provided with an external flange 28 which is adapted to seat within recesses 29 formed in the mold sections 11 and 12. Sleeve 25 has, at its end adjaecnt cavity 17, an internal annular shoulder 30, the purpose of which will be hereinafter explained. The plug member 26 has a central bore 31 adapted to receive therethrough one end of tube 27. The tube 27 fits snugly within the bore 31 of the plug 26 and the sleeve 25 so that a fluid-tight relationship exists between the outer tube surface and sleeve 25 and member 26 to provide a seal therebetween to prevent molten metal poured into the cavity 17 from leaking out of the mold around the tube 27.

In providing a tube with an extension in accordance with the present invention, that portion of the tube 27; for example, a steel tube, is cleaned by "bare" sanding or sand blasting it to remove from the tube surface a substantial amount of dirt, oxides and other impurities. The cleaned portion of tube 27 is then dusted with a powdered flux material or coated with a liquid type of flux composition. Thereafter, the tube 27 is positioned within plug 26 and sleeve 25 of the mold 10 so that the cleaned and fluxed portion of the tube extends through mold cavity 17 as a core. The mold sections 11 and 12 are then brought into an abutting fluid-tight relationship with one another and are clamped in that position by suitable means not shown. The mold may then be preheated by any suitable means (not shown) such as a blow torch, to a temperature of approximately 600° F. Following the step of preheating the mold 10, molten metal; for example, gray iron, is poured into trough 20 from a source not shown, and flows down through passages 21 into cavity 17. The molten metal entering the upper portion of cavity 17 impinges against substantially the top peripheral surface of the tube 27 and passes downwardly around the tube in contact with substantially the entire tube circumference after which the molten metal flows away from the bottom of tube 27 into the lower portion of the cavity 17. Thereafter, the molten metal flows through lower passages 23 into excess metal trough 22. This initial flow of molten metal, which is sufficient to fill trough 22, heats the tube surface to a proper bonding temperature as it flows downwardly upon the tube surface.

Additional molten metal in excess of the amount of molten metal necessary to fill cavity 17 is then continuously poured into the mold cavity 17 so as to impinge against the top of tube 27 and flow downwardly upon tube 27. This continuous flow of molten metal upon the surface of tube 27 maintains the tube surface at the proper bonding temperature so that, as the level of the molten metal rises within cavity 17 and around tube 27, the surface of the tube is at a temperature at which a metallurgical bond with the molten metal will take place. The molten metal and the surface of tube 27 are then allowed to cool and solidify within cavity 17. Since solidification of the molten metal and the tube surface takes place at the same time, a metallurgical union is effected between substantially the entire outer surface of the tube and the inner surface of the cast extension.

Figure 3:
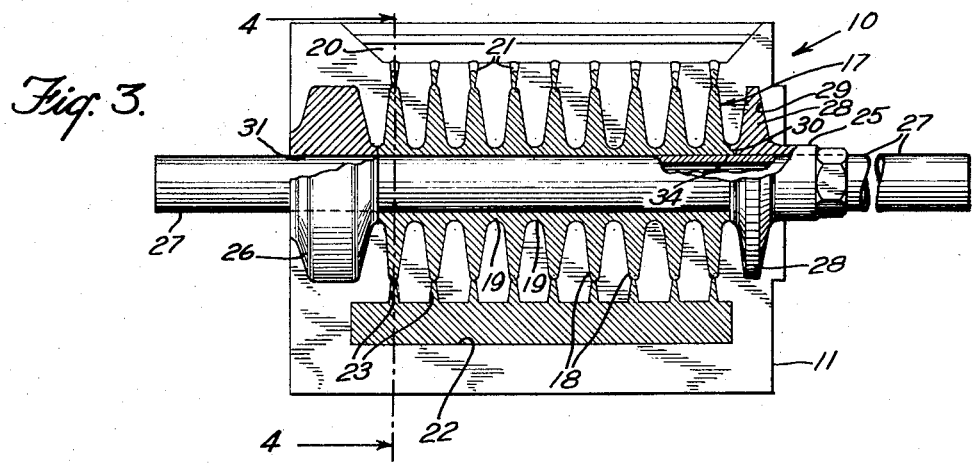
Fig. 3 is a vertical sectional view of a permanent type mold after a first casting employed in carrying out the process according to this invention.
Figure 5:
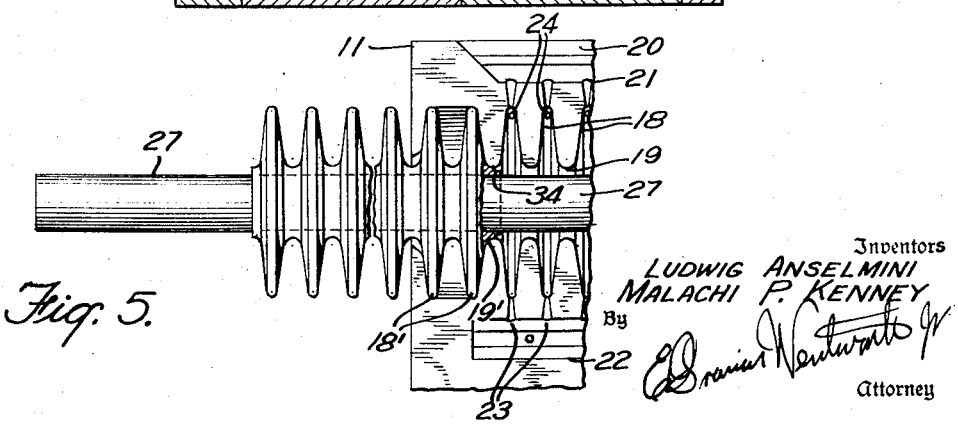
Fig. 5 is a fragmentary view in section of the tube in position within the mold preparatory to a second casting operation.

After the molten metal has solidified sections 11 and 12 of the mold 10 are parted and tube 27 is ejected by any desirable means, such as, ejector pins 32 and 33. The mold 10 is then cleaned and freed of metal. Thereafter, a section of tube 27 adjacent the cast extensions is prepared for a second casting operation in the same manner as previously described. With plug member 26 removed from tube 27, the tube is indexed axially to the left in Fig. 3 and re-positioned within the mold 10, as shown in Fig. 5, so that the last two cast ring members 18' and their hub portions 19' of the previous casting operation fit within the recess formerly occupied by plug 26 and form a seal to prevent molten metal from leaking out of the mold 10 along tube 27. A second section of cast extensions may thus be formed on tube 27 by the casting method previously described. A strong joint between the two cast sections is insured since the first cast section is provided with a shoulder 34, formed by the annular shoulder 30 of sleeve 25, upon which molten metal flows during the second pouring operation. Successive sections of cast extensions can then be formed about tube 27 until the desired number of cast extensions are provided thereon.

It can be readily seen from the foregoing description that a method of and apparatus for molding extensions to tubes has been disclosed which effects a superior metallurgical bond between the tube surface and the cast extensions by heating the tube surface to proper bonding temperature and maintaining that tube surface temperature as the molding cavity is filled. In addition the method provides for casting extensions of any desired length on a tube.

Inasmuch as changes may be made in the form, location and relative arrangement of the several parts without departing from the essential characteristics of the invention, it will be understood that the invention is not to be limited excepting by the scope of the appended claims.

What is claimed is:

1. A mold for casting simultaneously a plurality of integral extensions to a tube, comprising complementary sections adapted to be removably positioned in relationship to each other, said mold sections having abutting casting faces so formed as to provide a casting cavity of the desired number and shape of said extensions, said mold sections being adapted to receive axially therebetween a tube within said cavity in spaced relationship with the periphery of said cavity, the mold having a molten metal inlet positioned to discharge said metal into impinging relationship with the top of a tube positioned within the cavity thereby providing for flow of molten metal downwardly along substantially the entire surface of said tube, the mold having an excess metal receiving space below said cavity and of volumetric dimension necessary to receive the amount of excess molten metal required to heat the tube to proper metallurgical bonding temperature, and passage means communicating with the lower portion of said cavity and the excess metal space to carry molten metal out of said cavity.

2. A mold for casting simultaneously a plurality of integral extensions to a tube, comprising complementary sections adapted to be removably positioned in relationship to each other, said mold sections having abutting casting faces so formed as to provide a casting cavity of the desired number and shape of said extensions, said mold sections being adapted to receive axially therebetween a tube within said cavity in spaced relationship with the periphery of said cavity, the mold having a plurality of spaced molten metal inlet passages arranged longitudinally of the cavity to discharge said metal into impinging relationship with the top of a tube positioned within the cavity thereby providing for flow of molten metal downwardly along substantially the entire surface of said tube, the mold having an excess metal receiving space below said cavity and of volumetric dimension necessary to receive the amount of excess molten metal required to heat the tube to proper metallurgical bonding temperature, the mold being provided with a plurality of spaced molten metal outlet passages arranged longitudinally of the cavity and communicating with the excess metal receiving space to carry said metal out of said cavity.

3. A permanent split mold for casting simultaneously a plurality of integral extensions to a tube, comprising complementary sections adapted to be removably positioned in relationship to each other, said mold sections having abutting casting faces so formed as to provide a casting cavity of the desired number and shape of said extensions, said mold sections being adapted to receive axially therebetween a tube within said cavity in spaced relationship with the periphery of said cavity, the mold having a molten metal inlet positioned to discharge said metal into impinging relationship with the top of a tube positioned within the cavity thereby providing for flow of molten metal downwardly along substantially the entire surface of said tube, the mold having an excess metal receiving space below said cavity and of volumetric dimension necessary to receive the amount of excess molten metal required to heat the tube to proper metallurgical bonding temperature, and passage means communicating with the lower portion of said cavity and the excess metal space to carry molten metal out of said cavity.

4. A molding apparatus for casting simultaneously a plurality of integral extensions to a tube, comprising two mold sections adapted to be removably positioned in relationship to each other, said mold sections having abutting casting faces so formed as to provide a casting cavity of the desired number and shape of said extensions, said mold sections being adapted to receive axially therebetween a tube within said cavity in spaced relationship with the periphery of said cavity, the mold having a molten metal inlet positioned to discharge said metal into impinging relationship with the top of a tube positioned within the cavity thereby providing for flow of molten metal downwardly along substantially the entire surface of said tube, the mold having an excess metal receiving space below said cavity, and passage means communicating with the lower portion of said cavity and the excess metal space to carry molten metal out of said cavity said excess molten metal space having a volumetric dimension necessary to receive the amount of excess molten metal required to heat the tube to proper metallurgical bonding temperature, a plug member, a sleeve, said plug member and sleeve carried by the tube upon which extensions are to be cast, said mold sections being adapted adjacent the ends of said cavity to receive said plug member and sleeve whereby the tube is supported and positioned in the cavity and leakage of molten metal out of the cavity along the tube surface is prevented.

5. In the apparatus defined in claim 4 wherein the sleeve is provided with an internal annular shoulder adjacent the mold cavity to provide an external shoulder on the end of a cast extension.

6. A molding apparatus for casting a plurality of grill ring extensions on a tube, comprising two mold sections having symmetrical casting faces, each of said mold sections being secured to a support member, at least one of said support members being movable relative to the other support member to carry said casting faces of the mold sections in and out of abutment, said casting faces being formed to provide a plurality of axially spaced disc-shaped recesses joined by a plurality of adjacent hub-shaped recesses, said mold sections being adapted to receive axially therebetween a tube within spaced relationship to said hub-shaped recesses, said mold sections being formed to provide an excess molten metal space below said disc-shaped recesses, said excess metal space having a volumetric dimension necessary to receive the amount of excess molten metal required to heat the tube to proper metallurgical bonding temperature, the mold sections having a molten metal inlet passage communicating with the upper part of each disc-shaped recess, said passages being in substantial alignment with the vertical axis of said dis-shaped recesses to direct the flow of molten metal against the top surface of the tube thereby providing for flow of molten metal downwardly along substantially the entire surface of said tube, the mold sections having a plurality of outlet passages communicating with the lower part of the disc-shaped recesses and the said excess molten metal space to carry molten metal out of said disc-shaped recesses.

7. A permanent mold casting method for simultaneously forming a plurality of integral extended surface elements on a tube comprising the step of inserting the tube into a molding space of a mold, introducing a first quantity of molten metal into said space so as to impinge against substantially the top peripheral surface of said tube and for flow along substantially the entire surface of said tube to thereby cause the tube surface to be heated to a proper metallurgical bonding temperature, carrying said first quantity of molten metal out of said molding space into a cavity at the bottom of the mold, introducing an additional quantity of molten metal into the molding space so as to impinge against substantially the top peripheral surface of the tube and fill said space, allowing said additional molten metal to remain in said space until it solidifies, removing said tube from said molding space, indexing the tube axially, positioning the tube in the mold so as to bring that portion of the tube immediately adjacent the cast extended surface within the said molding space, introducing molten metal into the molding space in the same manner as aforesaid.

8. A permanent mold casting method for simultaneously forming a plurality of integral extended surface elements on a tube, comprising the step of inserting the tube into a molding space, introducing a first quantity of molten metal into said molding space so as to impinge the top surface of said tube to cause flow of molten metal downwardly along substantially the entire surface of said tube, introducing an additional quantity of molten metal into the molding space so as to impinge the top of said tube and flow downwardly upon substantially the entire circumferential surface of said tube, said additional molten metal being of such quantity as to fill the molding space, allowing said additional molten metal to remain in said space until it solidifies and metallurgically bonds with the surface of the tube.

9. A permanent mold casting method for simultaneously forming a plurality of integral extended surface elements of cast iron on a steel tube, comprising the steps of heating the mold to an elevated temperature, cleaning and covering with flux material that portion of the tube upon which the extended surface is to be cast, inserting the tube in the mold so that the cleaned and fluxed portion of the tube lies within the molding space, introducing a first quantity of molten cast iron into said space so as to impinge the top surface of said tube and flow downwardly along substantially the entire circumferential surface thereof in a sufficient amount to heat the surface of the tube to a proper metallurgical bonding temperature, conducting said quantity of molten cast iron out of said molding space into an excess metal cavity provided in the mold, introducing an additional quantity of molten cast iron into the molding space so as to impinge the top surface of the tube and flow downwardly upon substantially the entire circumferential surface of said tube, continuously introducing said additional quantity of molten cast iron until the space is filled, allowing said additional molten cast iron to remain in said space until it solidifies and metallurgically bonds with the surface of the tube, thereafter removing said tube from said molding space, cleaning said mold, cleaning and covering with flux material that portion of the tube immediately adjacent the first cast extended surface, indexing the tube axially so as to position that portion of the tube immediately adjacent the first cast extended surfaces within the molding space, introducing molten cast iron into the molding space in the same manner as aforesaid, allowing said molten cast iron to solidify, again removing said tube from the mold.

References Cited in the file of this patent

UNITED STATES PATENTS

| 749,556 | Harris | Jan. 12, 1904 |
| 763,465 | Cochran | June 28, 1904 |
| 1,738,056 | Hunter | Dec. 3, 1929 |
| 1,938,707 | Mann | Dec. 12, 1933 |
| 2,201,024 | Brown | May 14, 1940 |

FOREIGN PATENTS

| 849,001 | France | Apr. 7, 1939 |
| 743,093 | Germany | Dec. 17, 1943 |